（12) United States Patent
Fischer et al.

(10) Patent No.: US 6,497,390 B1
(45) Date of Patent: Dec. 24, 2002

(54) THERMAL PROTECTION SYSTEM ESPECIALLY FOR SPACE VEHICLES

(75) Inventors: Wolfgang Fischer, Ottersberg (DE); Walter Vogel, Salem (DE); Joerg Bolz, Bremen (DE); Wolff-Dieter Ebeling, Hildesheim (DE); Ulrich Rieck, Rosengarten (DE)

(73) Assignee: Astrium GmbH, Ottobrunn (DE)

( * ) Notice: Subject to any disclaimer, the term of this patent is extended or adjusted under 35 U.S.C. 154(b) by 176 days.

(21) Appl. No.: 09/669,128

(22) Filed: Sep. 25, 2000

(30) Foreign Application Priority Data

Sep. 23, 1999 (DE) .......................................... 199 45 586

(51) Int. Cl.$^7$ ................................................ B64G 1/46
(52) U.S. Cl. .................... 244/163; 244/158 R; 428/102; 428/114
(58) Field of Search ...................... 244/158 R, 158 A, 244/159, 163, 162; 428/102, 114

(56) References Cited

U.S. PATENT DOCUMENTS 5,626,951 A * 5/1997 Hogenson .................. 428/902
5,811,168 A * 9/1998 Rasky et al. ................ 428/102
5,958,583 A * 9/1999 Rorabaugh et al. ...... 106/287.1
6,007,026 A * 12/1999 Shorey .................... 244/158 A

* cited by examiner

Primary Examiner—J. Woodrow Eldred
(74) Attorney, Agent, or Firm—W. F. Fasse; W. G. Fasse

(57) ABSTRACT

A thermal protection system suitable as a heat shield for a space vehicle includes a flexible insulation mat that is adhesively bonded onto the outer skin of the space vehicle, a cover layer made of at least one ply of a ceramic fiber composite material secured onto the insulation mat, and a coating of an inorganic material applied onto an outer surface of the ceramic cover layer. The cover layer is secured to the insulation mat by adhesive bonding, stitching with ceramic threads or the like, or by a snap fastener button connection. The ceramic fiber composite materials of the cover layer include inorganic fibers which are preferably oxides, carbides or mixtures thereof embedded in a matrix of the same compositional components, whereby the components can be selected appropriately depending on the requirements of the particular application. The overall thermal protection system remains flexible, lightweight, and highly effective for thermal shielding, so that it may be used not only on the relatively cooler portions of the space vehicle, but also on the most highly thermally loaded areas such as the nose and the leading edges of wings and the like.

22 Claims, 3 Drawing Sheets

THERMAL PROTECTION SYSTEM ESPECIALLY FOR SPACE VEHICLES

PRIORITY CLAIM

This application is based on and claims the priority under 35 U.S.C. §119 of German Patent Application 199 45 586.4, filed on Sep. 23, 1999, the entire disclosure of which is incorporated herein by reference.

FIELD OF THE INVENTION

The invention relates to a thermal protection system, especially providing heat shielding for space vehicles, including a flexible insulation mat arranged on the outer skin of the space vehicle.

BACKGROUND INFORMATION

During ascent and during reentry of a space vehicle into the atmosphere of any heavenly body, e.g. not only during reentry into the Earth's atmosphere but also during reentry into the respective atmospheres of moons and planets such as Mars or Venus, the space vehicle is subjected to extreme aerodynamic, aerothermic, aeroelastic, mechanical and acoustic loads. For this reason, the ascent and reentry phases of a space mission are regarded as critical and determinative of the success of the mission. Therefore, it is important to equip the cold structure of the space vehicle with an effective thermal protection that can withstand all of the above described loads during the ascent and reentry phases, in order not to jeopardize the success of the entire space mission.

Various so-called reusable space transport vehicles are known, such as the U.S. space shuttle, the Russian BURAN, the originally planned European project HERMES, and the future Japanese space glider HOPE. For such reusable space transport vehicles, it is known to arrange ceramic tiles or shingles and other hot structures in the form of a rigid thermal protection system on the highly thermally loaded areas of the respective space vehicle, such as the underside or belly, the nose area, and the leading edges of the wings of the vehicle. On the other hand, the leeward sides of the components of the vehicle, which are not as highly thermally loaded, are typically provided with flexible insulation mats that are glued onto the cold structure of the space vehicle at such locations. Such conventional flexible insulation mats do not provide adequate thermal protection to be used at the highly thermally loaded areas mentioned above.

Throughout this application, the term "cold structure" refers to the structural components of the space vehicle, such as the skin thereof, which cannot directly withstand the high temperatures resulting during ascent and reentry. On the other hand, the term "hot structure" refers to a structural component that can directly withstand the high temperatures arising during ascent and reentry.

SUMMARY OF THE INVENTION

In view of the above it is an object of the invention to provide a thermal protection system of the above described general type for a space vehicle, which achieves the advantages of a flexible insulation mat or the like, such as a low weight, a high flexibility for accommodating the different thermal expansions of the cold structure of the space vehicle and the hot outer wall or surface of the insulation system, and a simple and economical mounting and maintenance of the system on the space vehicle, not only for the leeward or relatively colder surfaces of the space vehicle, but also for the windward or relatively hotter surfaces of the space vehicle. It is a further object of the invention to reduce the overall cost of the total thermal protection system for the space vehicle, while providing a high degree of flexibility to accommodate higher degrees of deformation of the cold structure of the vehicle. Yet another object of the invention is to provide relatively thinner wall thicknesses of the insulation material and thereby achieve a considerable weight reduction of the overall thermal protection system. The invention further aims to avoid or overcome the disadvantages of the prior art, and to achieve additional advantages, as are apparent from the present specification.

The above objects have been achieved in a thermal protection system according to the invention, comprising at least one flexible insulation mat that is applied over a large surface area of the outer skin of the space vehicle. Particularly according to the invention, the thermal protection system further comprises a cover layer including at least one layer or ply comprising a ceramic fiber composite material, and a coating comprising an inorganic material applied onto the cover layer.

The particular composition of the fiber composite material of the cover layer can be adapted to the respective requirements at hand, which depend on the respective particular mission as well as the particular location at which the thermal protection system is being applied to the space vehicle. For example, the fiber composite material preferably and advantageously consists of inorganic fibers, which are preferably oxides, carbides or mixtures thereof, and which are in turn embedded in a matrix of the same material composition as the fibers. Depending on the particular selected composition, different particular thermal protection results as well as mechanical characteristics will be achieved.

The present thermal protection system according to the invention is especially further characterized in that it reliably prevents the penetration or permeation of hot gases into the insulation mat that is applied to the outer surface of the space vehicle, because especially the cover layer and coating form a pressure-tight or gas-tight outer skin covering the surface of the mat and thus of the space vehicle. Simultaneously, the cover layer and coating of the thermal protection system achieves a large surface distribution or spreading and introduction of the arising aerothermic, mechanical and acoustical loads, which are then conducted further through the underlying insulation mat and are then distributed and introduced over a large surface area of the cold structure of the space vehicle. Moreover, the protective layer provides an extremely effective protection against corrosive wear mechanisms and against the occurrence of hot gas oxidation. Also, by appropriately selecting the material of the coating that is provided on the thermal protection system according to the invention, the thermo-optical characteristics, and especially the absorption/emission characteristic of the surface of the thermal protection system, can be optimally adjusted. As a further advantage, the thermal protection system according to the invention is characterized by a rather low catalytic action in comparison to the prior art.

The application of the cover layer onto the insulation mat is preferably achieved according to the invention by means of adhesive bonding or gluing, sewing or stitching, or by a button or snap connection. The connection of the thermal protection system onto the cold structure of the space vehicle is advantageously achieved by an adhesive bonding, and especially by means of a high temperature resistant adhesive that cures at or under normal room temperature (e.g. under 30° C.), and most preferably an adhesive based on silicone.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
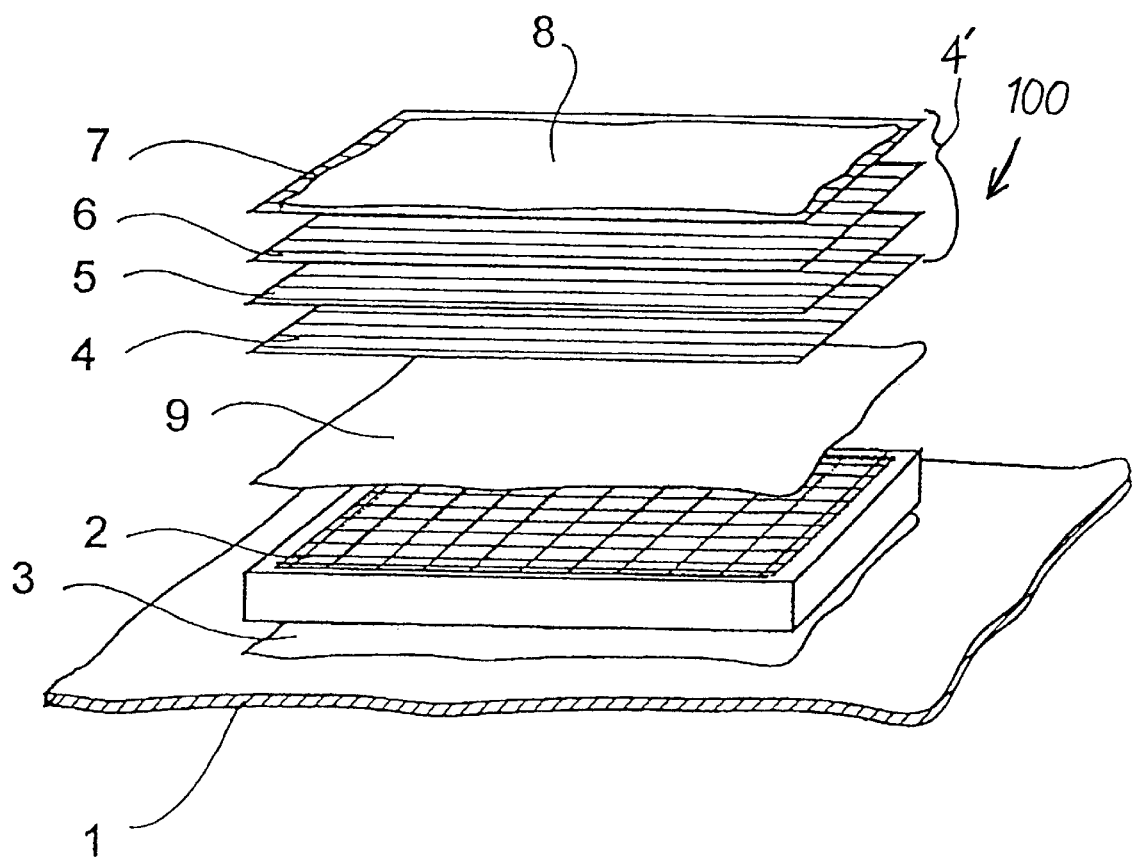
FIG. 1 is a schematic, perspective exploded view of the general construction of a thermal protection system for a space vehicle according to the invention.
Figure 2:
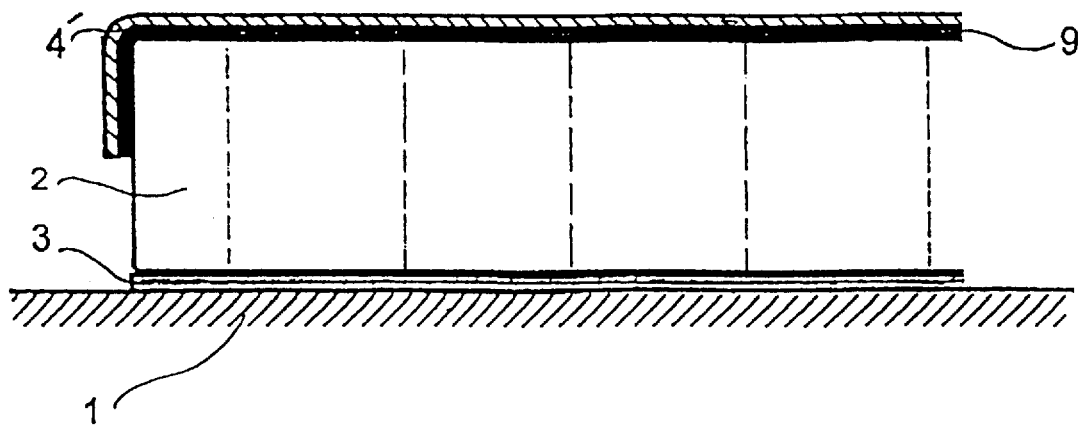
FIG. 2 is a vertical section through the arrangement according to FIG. 1.

FIGS. 1 and 2 show the general construction of a thermal protection system 100 that is provided to shield the cold structure of a space vehicle from the thermal loads that arise on the outer surface thereof especially during reentry into the atmosphere of a heavenly body. The thermal protection system 100 comprises a flexible insulation mat 2 that is secured or bonded onto the outer skin 1 of the cold structure of the space vehicle, by means of an adhesive bonding, which is applied in the form of a layer 3 of a silicone adhesive that cures at room temperature in this example. The flexible insulation mat 2 may have any composition and construction that is known for such flexible insulation mats in the prior art.

The thermal protection system 100 further comprises a ceramic cover layer 4' which may consist of one or several sub-layers or plies. In the present illustrated example, the ceramic cover layer 4" comprises four ceramic layers or plies 4, 5, 6 and 7. The plies 4, 5, 6, and 7 may comprise inorganic oxide based fibers, such as fibers of silica, alumina, and/or zirconia, embedded in a matrix of the same oxide materials as the fibers. Alternatively, the plies 4, 5, 6, and 7 may each respectively comprise a weft-filled woven web of inorganic fibers, and especially carbide based fibers such as silicon carbide fibers. The fibers as well as the matrix of the cover layer may alternatively be based on mixed carbides, for example based on silicon, boron, nitrogen and carbon. In FIG. 2, for the sake of simplicity, the cover layer 4' is simply shown as a single layer, omitting the detail of the several individual plies thereof as shown in the exploded view of FIG. 1.

The thermal protection system 100 additionally comprises an inorganic coating 8 applied onto the outer side of the uppermost ceramic cover layer 7. The coating 8 essentially consists of an inorganic binder based on at least one of the compounds $SiOC$, $SiO_2$, $SiC$, $SiBNC$, and/or $SiBN_3C$, as well as an inorganic filler preferably consisting essentially of at least one of the materials $SiB_6$, $SiC$, $TiB_2$, $Si_3N_4$, $SiB_3$, $ZrO_2$, $ZrSiO_4$, or a mixture of two or more of these components.

The protective cover layer 4' including sublayers or plies 4, 5, 6, and 7 is secured or bonded onto the underlying insulation mat 2 by means of an adhesive bonding 9 in the illustrated example of FIGS. 1 and 2. Preferably, the adhesive bonding is achieved using an adhesive 9 having a composition similar to the matrix of the ceramic cover layer 4'. Particularly, the adhesive may comprise at least one of $SiC$, $SiOC$, $SiO_2$, and $Al_2O_3$, or combinations thereof. Alternatively, any conventional ceramic based adhesive or ceramic based cement can be used in this context, depending on the respective prevailing requirements of the application. In any event, the adhesive 9 is applied as an adhesive layer 9 between the insulation mat 2 and the bottom-most sublayer or ply 4 of the cover layer 4'.

As can be seen in the view of FIG. 2, the cover layer 4' as well as the adhesive layer 9 can extend over the corners or edges of the insulation mat 2 and also extend over and cover at least a portion of the sides of the insulation mat 2. Depending on the particular application, it may be advantageous to cover the entirety of the sides of the insulation mat 2 with the cover layer 4', so as to provide the maximum protection of an all-around enclosed or encapsulated insulation mat 2.

Figure 3:
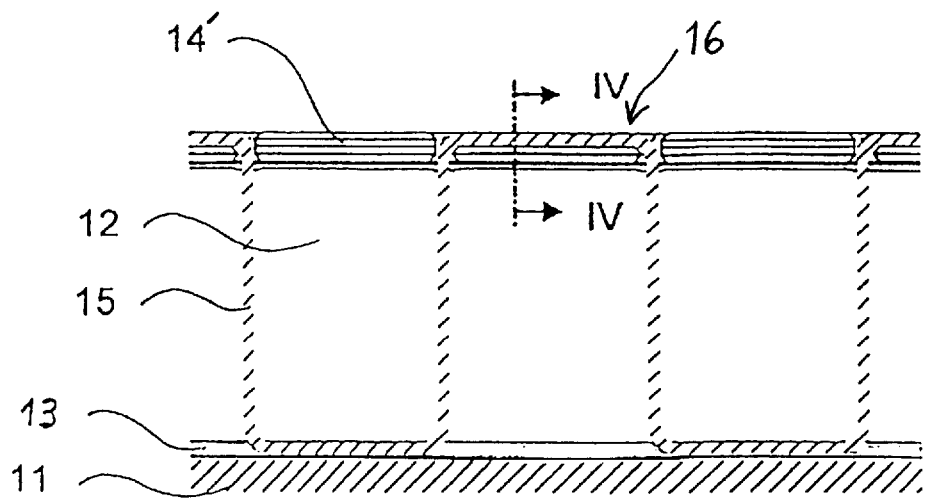
FIG. 3 is a vertical section generally similar to that of FIG. 2, but showing a varied embodiment of the thermal protection system.
Figure 4:
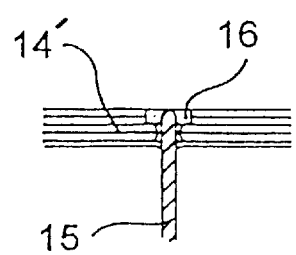
FIG. 4 is a partial detail view in section, along the section line IV—IV in the arrangement of FIG. 3.
Figure 5:
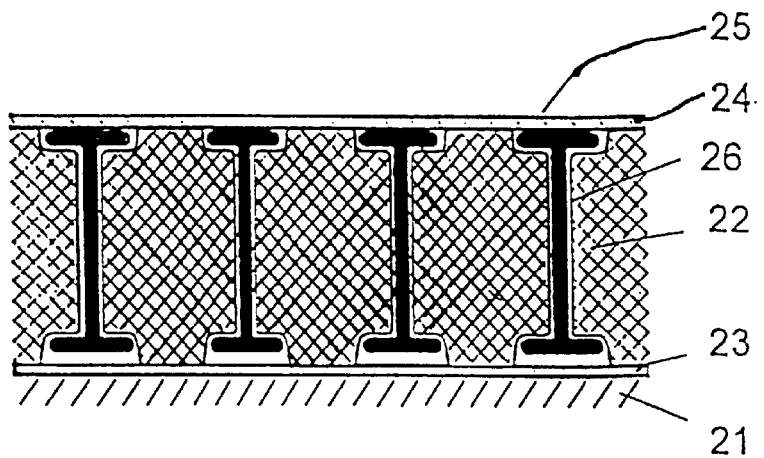
FIG. 5 is a vertical section generally similar to that of FIG. 2, but showing a further varied embodiment including ceramic buttons.

In the second example embodiment illustrated in FIGS. 3 and 4, many of the components corresponding to those of FIGS. 1 and 2 are identified by reference numbers that have been increased by ten. For example, the insulation mat 12 is adhesively bonded by the adhesive 13 onto the outer skin 11 of the space vehicle in the embodiment of FIG. 3. In this second embodiment of FIGS. 3 and 4, a stitched connection is provided between the ceramic cover layer 14' and the insulation mat 12. This stitched connection is provided by ceramic threads 15 which are guided through the insulation mat 12 and through bored holes in the ceramic fiber cover layer 14'. In this manner, the ceramic cover layer 14' is secured to the insulation mat 12 by the stitching 15, rather than using an adhesive layer 9 as in the embodiment of FIGS. 1 and 2. Depending on the requirements at hand, different spacings between the respective adjacent stitched seams as well as the stitching pitch can be selected as needed to achieve the required degree of securing.

In order to achieve an aerodynamically smooth outer surface of the thermal protection system 100 as shown in FIG. 3, the ceramic threads 15 can be recessed into grooves 16 that are provided in the outer surface of the cover layer 14' as shown especially in FIG. 4. Then, these grooves 16 may be covered by an additional fiber composite layer that is laminated thereon, or filled with a material corresponding to the matrix of the cover layer 14'. In this manner, a smooth outer surface is achieved. Then, a protective coating corresponding to the above described coating 8 may be applied on the outer surface of the cover layer 14', although such a coating is not shown in FIGS. 3 and 4 for simplicity. Finally, it should be noted that the bonding or securing of the insulation mat 12 onto the outer skin 11 of the space vehicle is carried out by an adhesive layer 13 interposed therebetween in an analogous manner as described above for the adhesive layer 3 in connection with FIGS. 1 and 2.

Figure 6:
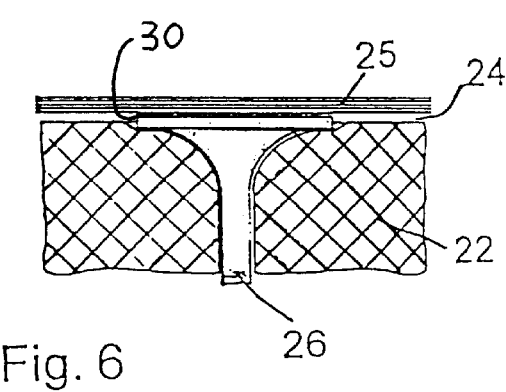
FIG. 6 is an enlarged detail portion of a first variation of the arrangement according to FIG. 5.
Figure 7:
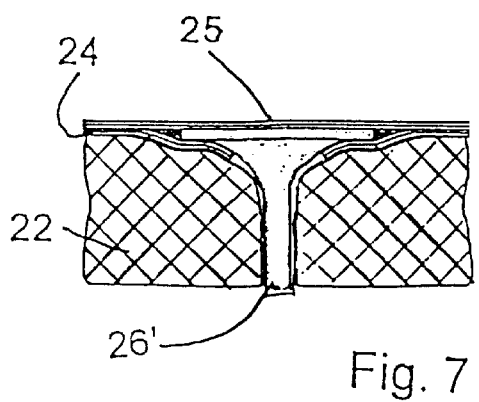
FIG. 7 is an enlarged detail portion of a second variation of the arrangement according to FIG. 5.

In a third embodiment shown in FIGS. 5 to 9, the coupling or connection of the ceramic cover layer 24, 25 onto the insulation mat 22 is achieved by means of buttons or snap fasteners 26, 26', 26", or 26'". This connection is especially carried out as a double-headed button connection. In the variant of FIG. 6, the respective buttons 26 or fasteners 26 are connected to the cover layer 24, 25 by means of adhesive bonding 30 using the above described adhesive materials. In the variant of FIG. 7, the respective buttons 26' or fasteners 26' are laminated directly into the cover layer 24, 25. Namely, the head of the button 26' is laminated between layers 24 and 25 of the cover layer. In any event, the outer head of the respective button 26, 26', 26", 26'" is connected, and preferably integrally connected, to a rigid shaft or pin, which preferably consists of the same material as the matrix of the ceramic cover layer in order to avoid different thermal expansions of the two components. This shaft extends generally through the thickness of the insulation mat 22.

Figure 8:
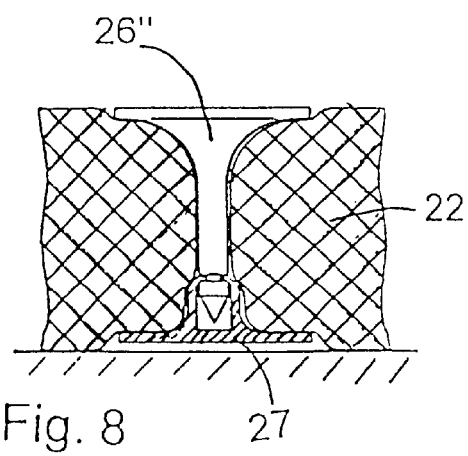
FIG. 8 is an enlarged detail portion of a third variation of the arrangement according to FIG. 5.
Figure 9:
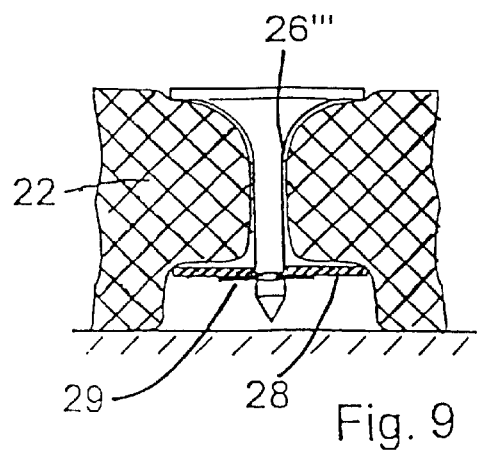
FIG. 9 is an enlarged detail portion of a fourth variation of the arrangement according to FIG. 5.

As shown in FIGS. 8 and 9, the button connection preferably further includes a second head 27 or 28 affixed to the opposite end of the shaft. In FIG. 8, the head 27 is a snap-type head similar to a pressure head or snap head into which an engaging configuration of a protruding free end of the shaft is engagingly inserted. Alternatively, the head is formed by a disk 28 that is secured by a clip or clamping disk 29, which may be a spring ring or the like that engages an appropriate engaging configuration on the free end of the shaft of the respective button. Since this portion of the button connection faces toward the cold structure of the spacecraft, and therefore is subjected to lower temperature loads than the opposite head of the respective button, the head 27 or 28, 29 can be fabricated of metal in addition to or instead of ceramic. The remaining parts of the button connection consist essentially of ceramic fiber composite materials or of monolithic ceramic. In this context, such buttons made of monolithic ceramic can be especially economically extruded or hot cast using a series mass production technique.

With the above arrangement, the outer ceramic cover layer is securely fastened to the insulation mat, which in turn is securely bonded onto the outer skin of the space vehicle. The overall resulting structure maintains the flexibility of the insulation mat, because the fiber composite ceramic outer layer is also flexible. Moreover, the ceramic outer layer and the coating thereon provide an additional degree of thermal protection as well as a gas impermeable barrier, to improve the overall thermal shielding performance of the thermal protection system. As such, the present thermal protection system is suitable for use not only on the relatively cooler portions of the skin of the space vehicle, but also on the most highly thermally loaded areas such as the nose and the leading edges of wings and the like of the space vehicle.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A thermal protection system adapted to be arranged on an outer skin of a space vehicle for providing thermal protection for the space vehicle, said thermal protection system comprising:
   a flexible insulation mat adapted to be arranged on the outer skin of the space vehicle;
   a cover layer comprising at least one ply consisting essentially of a ceramic fiber composite material arranged on said insulation mat; and
   a coating consisting essentially of an inorganic material arranged on said cover layer;
   wherein said cover layer and said coating together form a gas-impermeable barrier that prevents penetration of gas therethrough into said insulation mat; and
   wherein said thermal protection system in its entirety is flexible.

2. The thermal protection system according to claim 1, wherein said ceramic fiber composite material of said cover layer comprises oxide based inorganic fibers consisting essentially of at least one oxide.

3. The thermal protection system according to claim 2, wherein said at least one oxide is silica.

4. The thermal protection system according to claim 2, wherein said at least one oxide is alumina.

5. The thermal protection system according to claim 2, wherein said at least one oxide is zirconia.

6. The thermal protection system according to claim 2, wherein said ceramic fiber composite material of said cover layer further comprises a matrix in which said oxide based inorganic fibers are embedded, and wherein said matrix consists essentially of said at least one oxide of which said fibers essentially consist.

7. The thermal protection system according to claim 1, wherein said ceramic fiber composite material of said cover layer comprises carbide based inorganic fibers that consist essentially of at least one carbide and that are arranged to form a weft-filled woven web of said fibers.

8. The thermal protection system according to claim 7, wherein said at least one carbide is silicon carbide.

9. The thermal protection system according to claim 7, wherein said at least one carbide comprises a mixed carbide of silicon, boron, nitrogen and carbon.

10. The thermal protection system according to claim 9, wherein said ceramic fiber composite material of said cover layer further comprises a matrix in which said carbide based inorganic fibers are embedded, and wherein said matrix consists essentially of said mixed carbide.

11. The thermal protection system according to claim 1, wherein said coating consists essentially of an inorganic binder and an inorganic filler dispersed in said inorganic binder.

12. The thermal protection system according to claim 11, wherein said inorganic binder consists essentially of at least one inorganic material selected from the group consisting of $SiOC$, $SiO_2$, $SiC$, $SiBNC$, and $SiBN_3C$.

13. The thermal protection system according to claim 11, wherein said inorganic filler consists essentially of at least one inorganic material selected from the group consisting of $SiB_6$, $SiC$, $TiB_2$, $Si_3N_4$, $SiB_3$, $ZrO_2$, $ZrSiO_4$, and mixtures of at least two thereof.

14. The thermal protection system according to claim 1, further comprising a high temperature resistant inorganic adhesive interposed between and adhesively bonding together said cover layer and said insulation mat.

15. The thermal protection system according to claim 14, wherein said adhesive consists essentially of at least one of $SiC$, $SiOC$, $SiO_2$, $Al_2O_3$ and combinations of at least two thereof.

16. The thermal protection system according to claim 1, further comprising a ceramic thread arranged as a stitching that binds together said cover layer and said insulation mat.

17. The thermal protection system according to claim 1, further comprising ceramic buttons arranged to fasten together said cover layer and said insulation mat.

18. The thermal protection system according to claim 17, further comprising a ceramic adhesive arranged to adhesively bond said ceramic buttons to said cover layer.

19. The thermal protection system according to claim 17, wherein said cover layer comprises a plurality of said plies consisting essentially of said ceramic fiber composite material, and wherein said ceramic buttons include respective button heads that are laminated between respective ones of said plies so as to secure said buttons into said cover layer.

20. The thermal protection system according to claim 1, further comprising an organic adhesive contacting said insulation mat and adapted to adhesively bond said insulation mat onto the outer skin of the space vehicle.

21. The thermal protection system according to claim 20, wherein said organic adhesive is a silicone based adhesive.

22. In a space vehicle including a cold structure with an outer skin having at least one highly thermally loaded area selected from a nose area of said space vehicle, an underside belly area of said space vehicle, and a leading edge area of a wing of said space vehicle, and including a thermal protection system arranged on said outer skin at said highly thermally loaded area;

an improvement wherein said thermal protection system comprises:
a flexible insulation mat secured onto said outer skin at said highly thermally loaded area;
a cover layer comprising at least one ply consisting essentially of a ceramic fiber composite material arranged on said insulation mat; and
a coating consisting essentially of an inorganic material arranged on said cover layer;
wherein said cover layer and said coating together form a gas-impermeable barrier that prevents penetration of gas therethrough into said insulation mat; and
wherein said thermal protection system in its entirety is flexible.

* * * * *